(No Model.)

F. KÖNIG.
APPARATUS FOR DISTILLING.

No. 307,961. Patented Nov. 11, 1884.

WITNESSES:
Theo. G. Hoster
C. Sedgwick

INVENTOR:
F. König
BY Munn & Co
ATTORNEYS.

UNITED STATES PATENT OFFICE.

FRANZ KÖNIG, OF ASTI, ITALY.

APPARATUS FOR DISTILLING.

SPECIFICATION forming part of Letters Patent No. 307,961, dated November 11, 1884.

Application filed June 3, 1884. (No model.)

*To all whom it may concern:*

Be it known that I, FRANZ KÖNIG, a subject of the Emperor of Germany, and residing at Asti, in the Kingdom of Italy, have invented new and useful Improvements in Distilling, of which the following is a specification.

This invention relates to the distillation of liquids and to apparatus therefor, and is applicable in all cases where liquids having different boiling-points are required to be separated by fractional distillation—such as, for instance, to operations carried on in brandy, spirit, petroleum, tar, and other distilleries. According to the said invention the vapors of the boiling liquids are passed through one or more chambers, which are filled with substances—such as stones, pieces of metal, glass or porcelain, metallic wire, glass pipes, coke, or pumice-stones. Upon these substances, which offer a great surface to the said vapors, condensation takes place; the vapors of the least-vaporizing liquid condensing first. By reason of the intimate and extensive contact of the vapors with the liquid a further separation of fluids having different boiling-points is effected. The condensed portions of the vapors of the least-vaporizing liquids run back into the still, or into a rectifier which is placed between the still and the said chambers. The remaining vapors then pass to the refrigerator, where they are condensed. The above-mentioned receivers containing the cooling-substances may, when necessary, be cooled externally. The process heretofore employed, consisting in conveying alcoholic vapors through a chamber containing small pieces of charcoal, has nothing in common with the present process, as charcoal was only employed as means for freeing the alcohol from fusel-oil and could not be as efficiently used in the above-described process as other substances reduced to small pieces. By combining in this new process the rectification and dephlegmation operations in a simple and suitable manner, I am enabled to substitute, for the complicated and expensive apparatus heretofore employed a much simpler and cheaper apparatus, the operation of which is equivalent to that of the former and permits a considerable reduction in the outlay required to construct such apparatus, and also a saving of time and fuel.

In the accompanying drawings I have shown, by way of example, an apparatus serving for the distillation of spirits according to this invention.

Figure 1:
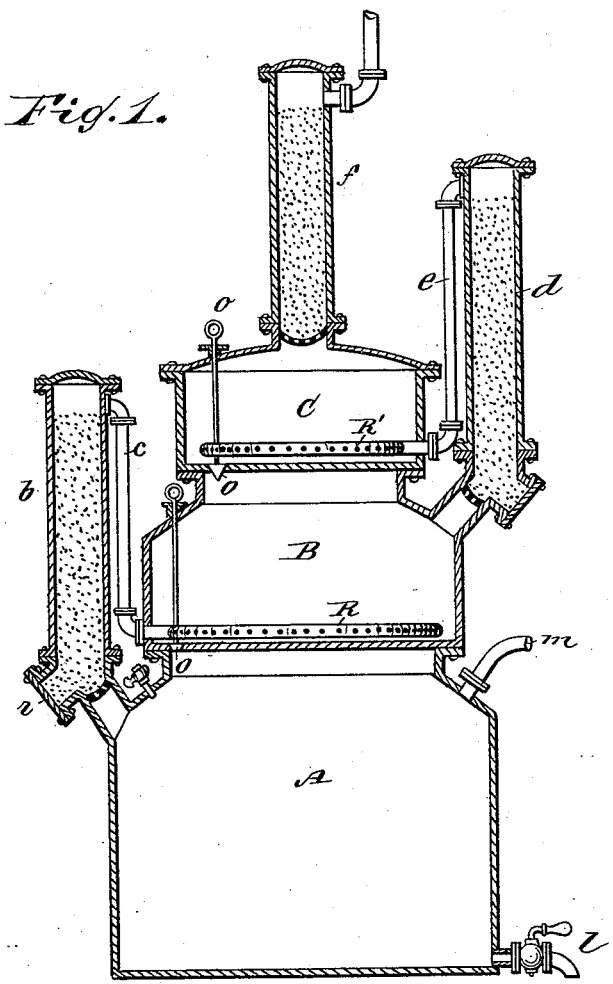
Figure 2:
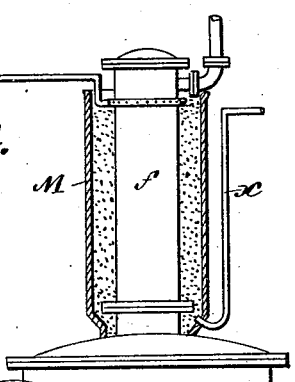

Figure 1 is a longitudinal sectional elevation of my improved distilling apparatus. Fig. 2 is a longitudinal sectional elevation of the top cylinder, the same being surrounded by a jacket containing refrigerating material.

A indicates a still, which is heated in the ordinary manner, and $b$ a cylinder filled with suitable cooling substances. The said cylinder is provided with an aperture at its side closed by the cover $r$, and serves for the removal of the said substances after the distillation is terminated. Upon the still is mounted the rectifier B.

To the upper end of the cylinder $b$ is connected a pipe, C, which leads into the said rectifier at the lower part, and has connected with it a pipe, R, which is provided with perforations through which the vapors enter and come into intimate contact with the condensed liquid.

At the upper extremity of the rectifier B is arranged a second cylinder, $d$, similar to the cylinder $b$, and filled with the same kind of substances as the latter. The upper extremity of this cylinder is connected with the rectifier C by means of a pipe, $e$, and pipe R', provided with perforations.

Upon the rectifier C is arranged a third cylinder, $f$, filled with the same kind of substances as the above-mentioned cylinders, and the upper end of which is connected with an ordinary refrigerator.

$m$ indicates the aperture through which the still is supplied with alcohol or other liquid, the residues of which at the termination of the distillation are allowed to escape through the cock $l$. The condensed liquids in the rectifiers B and C, which contain a certain amount of alcohol, are allowed to run back into the still by raising the conical valves O, and are redistilled with a fresh portion of liquid.

By using this apparatus it is easy (even from fermented mash) to produce rectified alcohol of from 90° to 93° in a proportionately shorter time and with a less expense of heat than by any other apparatus.

The operation of this apparatus is greatly enhanced when, instead of one cylinder, $b$, as employed in the first arrangement, being arranged upon the still, two or more are employed and communicate with the pipe R. The number of cylinders may be increased, as desired. By cooling, the concentration of the alcohol can be raised to from 95° to 96° centigrade. The cooling is effected by surrounding the cylinder $f$ with a casing, M, Fig. 2, and filling the space between with small pieces of any suitable material. The cold water enters at the top thereof and runs out through the pipe $x$. In the distillation of petroleum only one cylinder, mounted upon the still and filled with the cooling substances, is necessary in order to obtain a sufficient separation of the component parts of different liquids. In most cases the arrangement of three cylinders will suffice. There is, however, no objection in arranging a fourth cylinder, when required.

The above-described apparatus may be varied as regards form and dimensions without departing from the nature of the said invention. This process may also be applied to apparatus heretofore employed—for instance, upon the main column or still in apparatus used for the distillation of alcohol may be placed a cylinder filled with any of the above-mentioned substances, the other parts of the apparatus being retained.

I am aware that it is not broadly new to employ chambers filled with cooling substances, and therefore do not claim such invention.

Having thus described my invention and the manner of employing the same, I claim—

1. The combination, with the still A and the rectifier B, of the cylinder $b$, filled with a cooling substance, and provided with the door $r$, the perforated pipe R, arranged in the rectifier, and the pipe $c$, extending from the upper part of the cylinder $b$ to the pipe R, substantially as herein shown and described.

2. The combination, with the still A and the rectifiers B C, of the cylinders $b\ d\ f$, filled with cooling substances, and provided with doors at their lower ends, the perforated pipes R R', the connecting-pipes $c\ e$, and the valves $o$, substantially as herein shown and described.

In testimony whereof I have signed my name to this specification in the presence of two subscribing witnesses.

FRANZ KÖNIG.

Witnesses:
  SAROTTA DE ZEYK,
  ROSE GANTIN.